(12) United States Patent
Akita

(10) Patent No.: US 8,379,707 B2
(45) Date of Patent: Feb. 19, 2013

(54) SIGNAL ANALYZER AND METHODS FOR DISPLAYING CONSTELLATIONS

(75) Inventor: Yoneo Akita, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 12/434,531

(22) Filed: May 1, 2009

(65) Prior Publication Data

US 2011/0158306 A1    Jun. 30, 2011

(30) Foreign Application Priority Data

May 2, 2008    (JP) ................................. 2008-120754

(51) Int. Cl.
*H04B 3/46* (2006.01)
(52) U.S. Cl. ........................................ 375/228; 375/224
(58) Field of Classification Search .................. 375/228, 375/224

See application file for complete search history.

(56) References Cited

U.S. PATENT DOCUMENTS

| | | | |
|---|---|---|---|
| 2002/0006158 A1* | 1/2002 | Schmidl et al. | 375/150 |
| 2002/0044531 A1* | 4/2002 | Cooper et al. | 370/248 |
| 2004/0114701 A1* | 6/2004 | Markman | 375/371 |
| 2004/0213170 A1* | 10/2004 | Bremer | 370/282 |

* cited by examiner

*Primary Examiner* — David C. Payne
*Assistant Examiner* — Brian J Stevens
(74) *Attorney, Agent, or Firm* — Michael A. Nelson

(57) ABSTRACT

Constellation display allows a user to evaluate the quality of a signal under test with the constellation display even if the signal is a digital modulation signal that has many possible ideal phases. A signal analyzer 10 acquires time domain data of the signal under test that has N ideal phases. The signal analyzer 10 demodulates the signal under test to measure the phases $\theta m$ and amplitudes $Am$ of the symbols of the signal. Phase differences $d\theta$ between the ideal and measured phases of the measured symbols are calculated. K group phases $\theta gi$ are assigned to N of the ideal phases. The signal analyzer displays a constellation using phases $\theta gi+d\theta$ and the measured amplitudes $Am$. That is, points are plotted at locations of $X=Am*\cos(\theta gi+d\theta)+jAm*\sin(\theta gi+d\theta)$ on a complex plane.

8 Claims, 4 Drawing Sheets

(A) QPSK SIGNAL WITH LOW NOISE (B) QPSK SIGNAL WITH HIGH NOISE

SIGNAL ANALYZER AND METHODS FOR DISPLAYING CONSTELLATIONS

TECHNICAL FIELD

Embodiments of the present invention relate to methods and apparatus for displaying a constellation for easily evaluating quality of a digital modulation signal under test that has many phases where the symbol points may be located.

BACKGROUND

Various systems, such as a wireless communication system including a mobile phones, are sometimes required to test whether they work properly. A signal analyzer may be used for measuring signals of the system under test. The signal analyzer can analyze a signal from viewpoints of both time and frequency domains. It converts the signal under test into digital I and Q data of the time domain and generates digital data of the frequency domain from the time domain data by FFT (Fast Fourier Transform) calculation. The resultant data are displayed as a waveform and/or numeric values on the display of the signal analyzer. The signal analyzer shows the time domain data corresponding to the frequency domain data of the signal under test, which makes it possible to provide various analyses from viewpoints of both the time and frequency domains. U.S. Pat. No. 6,377,617 discloses how to produce the frequency domain data with keeping correspondence relationship with the time domain data.

A wireless communication system uses various digital modulations. The signal analyzer 10 provides a constellation display that shows symbols of a digital modulation signal under test on complex coordinates.

FIG. 2 is a constellation display of a signal under test using QPSK. If noise level is low, measured symbol points are located around the respective ideal symbol points as shown in FIG. 2A. However, if the noise level is high, many of measured symbol points are located away from the respective ideal symbol points as shown in FIG. 2B. That is, the constellation display of the signal under test can be used for evaluating the quality of the digital modulation signal.

FIG. 3 show a relationship between an ideal symbol point and a measured symbol point on a complex plane. If a symbol is demodulated from a signal under test, measured phase θm and amplitude Am of the symbol points are sometimes different from the ideal phase θr and amplitude Ar because of noise on the propagation path, etc. For example, there may be a phase difference dθ between the measured and ideal phases θm and θr. The measured and ideal amplitude Am and Ar may have an amplitude difference dA. The constellation display visually shows the errors dθ and dA.

FIG. 4 is a constellation display of a signal under test using multi-h CPM (Continuous Phase Modulation) as the digital modulation. FIG. 4A shows an ideal case wherein the ideal symbol points may locate at 32 phase positions.

FIG. 4B shows a case with noise. The multi-h CPM signal has a small phase difference between the adjacent ideal symbol points so that small noise easily mingles a measured symbol point and the adjacent symbol points. As described, if the digital modulation signal has many possible phases, it may be difficult for a user to evaluate the quality of the signal under test even if the user observes the constellation display.

What is desired is to make it possible to evaluate the quality of a digital modulation signal under test with constellation display even if the signal has many possible phase positions.

SUMMARY

Embodiments of the present invention provide constellation display methods suitable for the digital modulation signal under test that has many ideal phases where the ideal symbol points may be located. It assigns K (K is an integer) group phases to N (N is an integer and larger than K) ideal phases that the ideal symbols of the digital modulation signal under test may locate at. The constellation display is conducted using the amplitudes of the symbol points of the signal under test and the phases of respectively adding the phase differences between the symbol phases of the signal under test and the ideal phases, and the group phases that are assigned to the ideal phases of the symbol points. Wherein the phase differences between the adjacent group phases are arranged to be large enough. Then, the present invention resolves difficulty of recognizing errors of the symbols due to the small phase differences between the symbol points on the constellation display while the errors are reflected on the constellation display.

The group phases may be assigned to the ideal phases according to the phases obtained by multiplying the respective ideal phases and N/K wherein K is selected as N/K is a divisor of N.

In other embodiment, K of phase ranges are defined, and the group phases may be assigned to the ideal phases depending on which ranges the ideal phases belong to.

Further, the group phases may be assigned to the ideal phases depending on the values of the ideal symbols.

Further embodiments of the present invention provide apparatus for displaying a constellation. Measuring means measures phases and amplitudes of symbol points of a digital modulation signal under test. Phase difference calculating means calculates phase differences between the ideal phases of the symbol points and the measured phases. Group phase assigning means assigns K (K is an integer) group phases to N (N is an integer and larger than K) ideal phases that the ideal symbols of the digital modulation signal under test may locate at. Display means displays the constellation using the amplitudes of the symbol points of the signal under test and the phases of respectively adding the phase differences between the symbol phases of the signal under test and the ideal phases, and the group phases that are assigned to the ideal phases of the symbol points. Then, the apparatus according to the present invention resolves difficulty of recognizing errors of the symbols due to the conventional small phase differences between the symbol points on the constellation display while the errors are reflected on the constellation display.

The objects, advantages and other novel features of the present invention are apparent from the following detailed description when read in conjunction with the appended claims and attached drawings.

DETAILED DESCRIPTION

Figure 1:
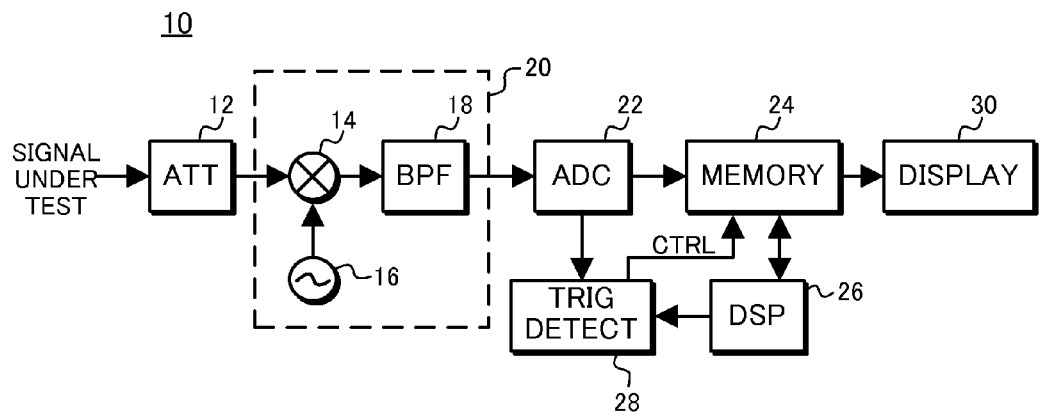
FIG. 1 is a block diagram of a signal analyzer.
Figure 2:
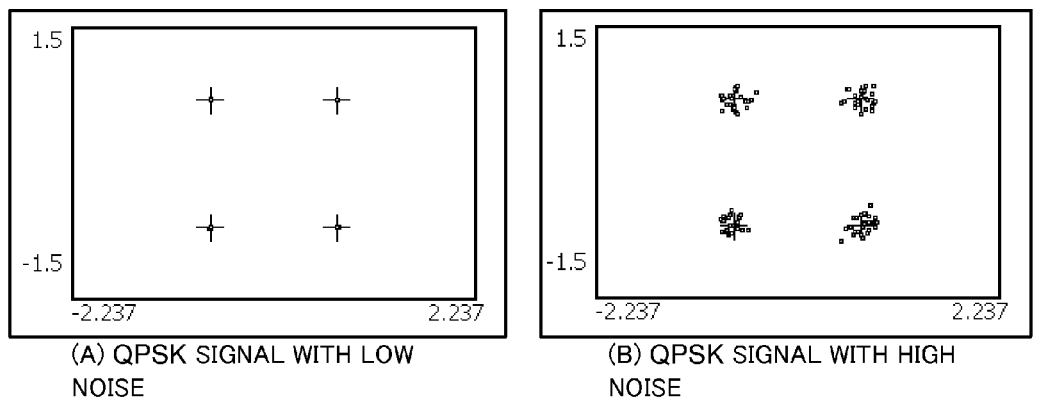
FIG. 2 shows constellation displays of signals under test using QPSK.
Figure 3:
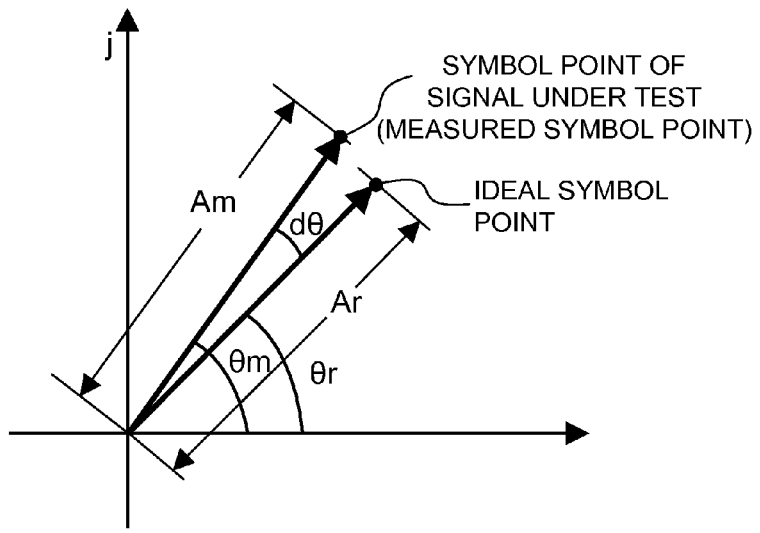
FIG. 3 shows a relationship between an ideal symbol point and a measured symbol point on a complex plane.
Figure 4:
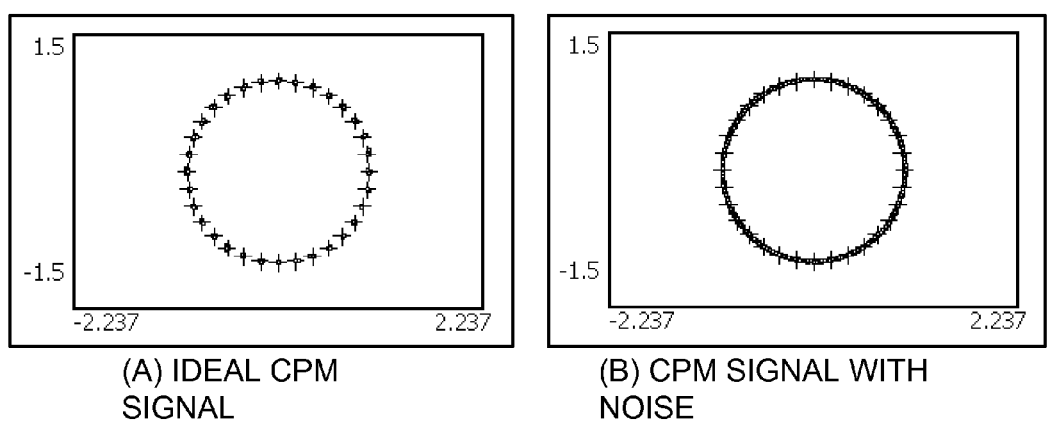
FIG. 4 shows constellation displays of signals under test using multi-h CPM as digital modulation.

The present invention may be realized by installing software or firmware for realizing the present invention on the hardware shown in FIG. 1, for example. Then, the present invention is described below as it works on the hardware shown in FIG. 1, for example.

FIG. 1 is a block diagram of a signal analyzer 10. In addition to the dedicated hardware obtaining and digitizing the signal, the signal analyzer 10 may have capabilities and hardware similar to a personal computer (PC) and adopt a generally used CPU and operating system so that it provides a PC-like user interface through a mouse, a keyboard on the operation panel, etc. for various settings, and stores a large amount of data and program in a hard disk drive (HDD) though they are not shown. The CPU may be used to control the system shown in FIG. 1, including the DSP. Individual components, such as the DSP, may need to be modified to support embodiments of the present invention.

An input attenuator 12 properly adjusts the level of a signal under test and the adjusted signal is provided to an analog down-converter 20. The down-converter 20 has mixer 14, local oscillator 16 and bandpass filter (BPF) 18 for analog-down-conversion of the frequency of the input signal to produce an intermediate frequency (IF) signal. An analog to digital converter (ADC) 22 converts the analog IF signal into digital data (time domain data). A memory 24 stores the digital data of the IF signal. A digital signal processor (DSP) 26 reads the IF signal data from the memory 24, digitally down-converts the read data and produces the frequency domain data by fast Fourier transform (FFT) calculation. The frequency domain data are stored in the memory 24 and displayed as a waveform and/or numeric values. The DSP 26 may conduct various other calculations according to the program stored in the HDD.

A trigger detection circuit 28 receives the time domain data from the ADC 22 and the frequency domain data from the DSP 26 to detect data satisfying a user-defined trigger condition for retaining desired time domain data and/or frequency domain data in the memory 24.

Figure 5:
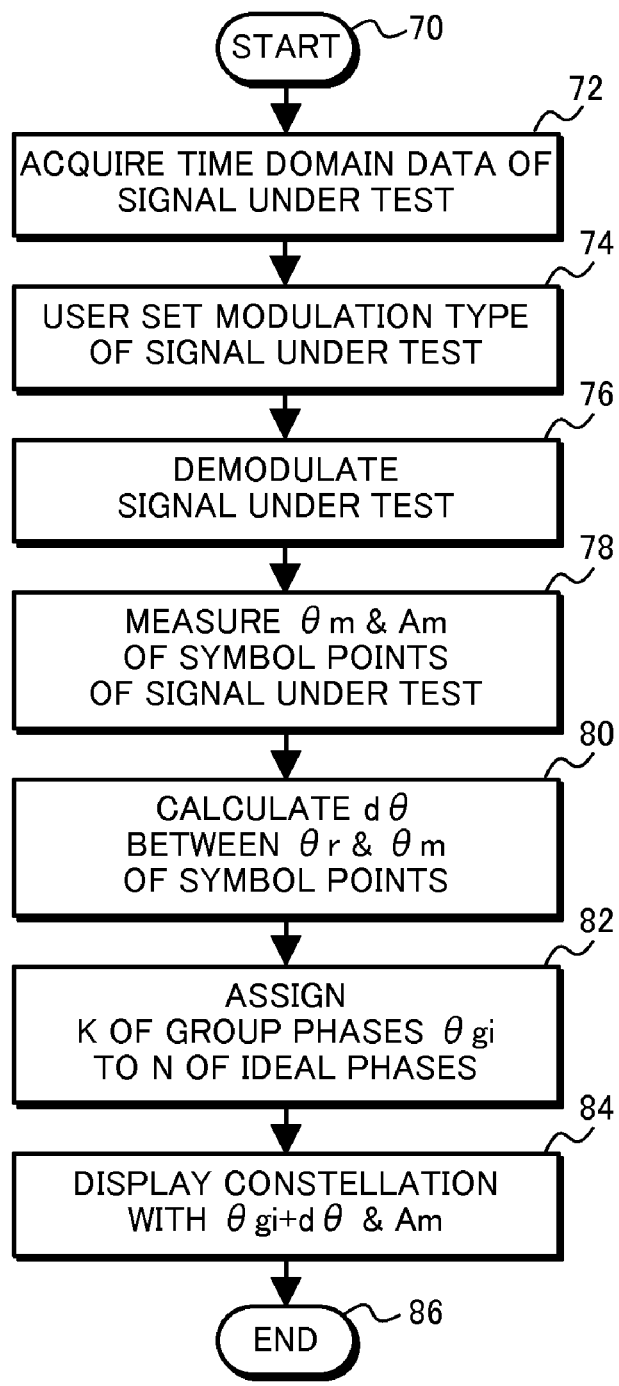
FIG. 5 is an example of a flowchart for a constellation display according to embodiments of the present invention.

FIG. 5 is an example of a flowchart on processes for displaying constellation according to the present invention. In step 72, the signal analyzer 10 acquires time domain data of a signal under test as is well known. A user sets digital modulation type of the signal under test to the signal analyzer 10 (step 74). The signal analyzer 10 demodulates the signal under test (step 76) to measure the phases $\theta m$ and amplitudes $Am$ of the symbols of the signal (step 78).

Then, phase differences $d\theta$ between the ideal and measured phases of the measured symbols are calculated (step 80). Because the modulation type was set to the signal analyzer 10 in the step 74, the signal analyzer can determine that each measured symbol point should have which ideal phase among the ideal phases unless each measured phase $\theta m$ has an extremely large error.

The number of the possible ideal phases is determined depending on the digital modulation. Then, let the number of the possible ideal phases of a signal under test be N (N is an integer), and the present invention assigns K (K is an integer and less than N) of group phases $\theta gi$ (i=1, 2, ..., K) to N of the ideal phases (step 82) as described below. In step 84, the signal analyzer displays a constellation using phases $\theta gi + d\theta$ and the measured amplitudes $Am$. That is, points are plotted at locations of $X = Am*\cos(\theta gi + d\theta) + jAm*\sin(\theta gi + d\theta)$ on a complex plane.

The group phases $\theta gi$ have wide phase differences relative to each other as described below, which reduces difficulty of visually recognizing the errors because of the small phase difference between the adjacent symbols described as the prior art. At the same time, the constellation display reflects the error of each symbol.

Figure 6:
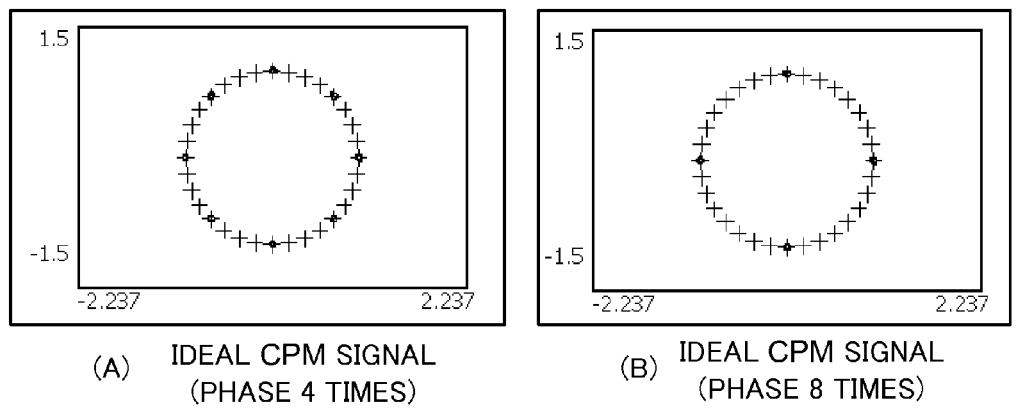
FIG. 6 is examples of constellation displays of ideal multi-h CPM signals of which N is 32 according to embodiments of the present invention.
Figure 7:
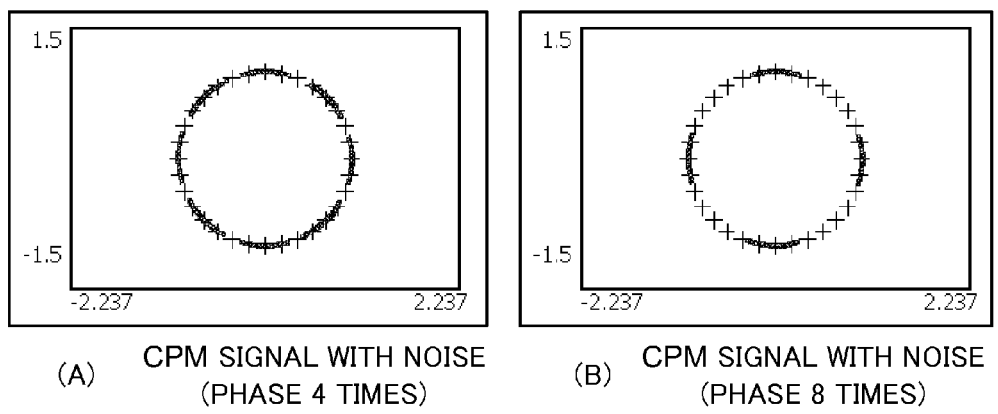
FIG. 7 shows examples of constellation displays of multi-h CPM signals with noise of which N is 32 according to an embodiment of the present invention.

FIG. 6 shows examples of constellation displays of an ideal multi-h CPM signal of which N is 32 according to an embodiment of the present invention. FIG. 7 shows examples of constellation displays of a multi-h CPM signal of which N is 32 having noise according to another embodiment of the present invention. "+" marks in the figures indicate locations of the original ideal symbols. As shown in FIGS. 6 and 7, the N symbols are displayed as points of the respective assigned groups and the more points are observed in each group the more errors exist different from the ideal phases and amplitudes. As described, embodiments of the present invention allow a user to evaluate the quality of a signal under test with the constellation display even if the signal is the digital modulation signal that has many possible ideal phases.

Now, it is described how to assign K of the group phases $\theta gi$ to N of the ideal phases below.

According to one of the embodiments, K is selected as N/K can be one of the divisors of N and the group phases are assigned to the ideal phases depending on the phases obtained by multiplying the respective ideal phases by N/K. For example, in case of multi-h CPM signal of which N is 32, if 4 is selected for K, N/K is 8. One of the ideal phases, $2\pi/32$, multiplied by 8 is $\pi/2$. When this process is done for 32 of the ideal phases, each of the ideal phases is converted to one of four phases 0, $\pi/2$, $\pi$ and $3\pi/2$ so that these four phases are assigned to the respective ideal phases as the group phases. FIGS. 6B and 7B are examples of constellation displays according to the described processes wherein K is 4. FIGS. 6A and 7A are examples of constellation displays wherein K is 8.

Another embodiment is that K of phase ranges are defined and the group phases are assigned to the ideal phases depending on which phase range the ideal phase belongs to. For example, if K is 4, the group phases $\theta gi$ are assigned to the ideal phases $\theta r$ as follows:

If $0 = <\theta r < \pi/2$, then $\theta g1 = \pi/4$
If $\pi/2 = <\theta r < \pi$, then $\theta g2 = 3\pi/4$
If $\pi = <\theta r < 3\pi/2$, then $\theta g3 = 5\pi/4$
If $3\pi/2 = <\theta r < 2\pi$, then $\theta g4 = 7\pi/4$ wherein "$0 = <\theta r$" means that $\theta r$ is zero or more, for example.

Further, the group phases may be assigned to the ideal phases depending on the values of the ideal symbols. For example, one symbol of the $\pi/4$-shift QPSK digital modulation has four values (2 bits) and each of the group phases may be assigned to each value of the symbol. Specifically, the group phases may be assigned as below.

If the symbol is "00", then $\theta g1 = \pi/4$.
If the symbol is "01", then $\theta g2 = 3\pi/4$.
If the symbol is "10", then $\theta g3 = 5\pi/4$.
If the symbol is "11", then $\theta g3 = 7\pi/4$.

In the described embodiments, it would be preferable for better visibility to dispose K of the group phases evenly with the same phase difference of $2\pi/K$ relative to each other. However, the present invention is not limited to this but may be realized by arranging as the phase differences between the adjacent group phases are large enough.

As described above, the present invention allows a user to evaluate the quality of a signal under test with the constellation display even if the signal is a digital modulation signal that has many possible ideal phases. The digital modulation signal used in the above embodiments has the same amplitude of the ideal symbols but may be another signal that has different amplitudes.

In the embodiments described herein, an FFT is indicated as being used to transform time domain data into frequency domain data. Those of ordinary skill in the art will understand that other methods of transforming time domain data into frequency domain data are similarly applicable including other forms of discrete Fourier Transforms and Chirp-Z transforms for example.

Although the invention has been disclosed in terms of the preferred and alternative embodiments disclosed herein, those skilled in the art will appreciate that modifications and improvements may be made without departing from the scope of the invention.

What is claimed is:

1. A method for displaying a constellation for a digital modulation signal under test with a signal analyzer, comprising steps of:

assigning an integer K group phases to an integer N ideal phases where the ideal symbols of the digital modulation signal under test are allowed to locate, wherein N is larger than K and K is one or more; and displaying a constellation using the amplitudes of the symbol points of the signal under test and the phases of respectively adding the phase differences between the symbol phases of the signal under test and the ideal phases, and the group phases that are assigned to the ideal phases of the symbol points.

2. The method for displaying a constellation as recited in claim 1 wherein K is selected as N/K is a divisor of N and the group phases are assigned to the ideal phases according to the phases obtained by multiplying the respective ideal phases and N/K.

3. The method for displaying a constellation as recited in claim 1 wherein K of phase ranges are defined, and the group phases are assigned to the ideal phases depending on which ranges the ideal phases belong to.

4. The method for displaying a constellation as recited in claim 1 wherein the group phases are assigned to the ideal phases depending on the values of the ideal symbols.

5. An apparatus for displaying a constellation for a digital modulation signal under test, comprising:

means for measuring phases and amplitudes of symbol points of the digital modulation signal under test;

means for calculating phase differences between the ideal phases of the symbol points and the measured phases;

means for assigning an integer K group phases to an integer N ideal phases where the ideal symbols of the digital modulation signal under test are allowed to locate, wherein N is larger than K and K is one or more; and means for displaying a constellation using the amplitudes of the symbol points of the signal under test and the phases of respectively adding the phase differences between the symbol phases of the signal under test and the ideal phases, and the group phases that are assigned to the ideal phases of the symbol points.

6. The apparatus for displaying a constellation as recited in claim 5 wherein K is selected as N/K is a divisor of N and the group phases are assigned to the ideal phases according to the phases obtained by multiplying the respective ideal phases and N/K.

7. The apparatus for displaying a constellation as recited in claim 5 wherein K of phase ranges are defined, and the group phases are assigned to the ideal phases depending on which ranges the ideal phases belong to.

8. The apparatus for displaying a constellation as recited in claim 5 wherein the group phases are assigned to the ideal phases depending on the values of the ideal symbols.

* * * * *